United States Patent

Donahue et al.

[11] Patent Number: 5,526,022
[45] Date of Patent: Jun. 11, 1996

[54] SOURCELESS ORIENTATION SENSOR

[75] Inventors: Michael J. Donahue; Mark D. Pesce; Marc de Groot, all of San Francisco; Michael A. Perry, Oakland, all of Calif.; Donald E. Drumm, Billerica, Mass.

[73] Assignee: Virtual I/O, Inc., Seattle, Wash.

[21] Appl. No.: 992

[22] Filed: Jan. 6, 1993

[51] Int. Cl.[6] ............................................. G09G 5/00
[52] U.S. Cl. .................................... 345/156; 324/253
[58] Field of Search .............................. 345/156–162; 358/87; 200/61.52; 340/440; 324/253

[56] References Cited

U.S. PATENT DOCUMENTS

| | | | |
|---|---|---|---|
| D. 300,476 | 3/1989 | Sestak | D 29/18 |
| D. 301,644 | 6/1989 | Sestak | D 29/18 |
| D. 334,557 | 4/1993 | Hunter et al. | D 14/114 |
| D. 334,742 | 4/1993 | Hunter et al. | D 14/113 |
| D. 337,320 | 7/1993 | Hunter et al. | D 14/113 |
| D. 338,514 | 8/1993 | Holmes | D 21/240 |
| 2,274,405 | 12/1942 | Webster | 351/158 |
| 2,581,428 | 1/1952 | McCarthy | 33/224 |
| 2,581,436 | 1/1952 | McCarthy | 318/24 |
| 2,585,956 | 2/1952 | McCarthty | 33/224 |
| 2,955,156 | 10/1960 | Heilig | 178/6.5 |
| 2,958,258 | 11/1960 | Kelly | 88/24 |
| 3,043,910 | 7/1962 | Hicks | 178/7.85 |
| 3,232,561 | 2/1966 | Adams | 244/1 |
| 3,355,942 | 12/1967 | Freeman | 73/178 |
| 3,394,202 | 7/1968 | Deering | 353/7 |
| 3,405,355 | 10/1968 | Hebbert | 324/46 |
| 3,434,219 | 3/1969 | Bowman | 33/205 |
| 3,487,299 | 12/1969 | Hart et al. | 324/43 |
| 3,573,610 | 4/1971 | Kesselring | 324/43 |
| 3,584,388 | 6/1971 | Petrov et al. | 33/225 |
| 3,589,795 | 6/1971 | Miyazaki et al. | 350/96 B |
| 3,614,314 | 10/1971 | Rossire | 178/7.88 |
| 3,621,584 | 11/1971 | Burt | 33/224 |
| 3,825,911 | 7/1974 | Burns | 340/198 |
| 3,833,901 | 9/1974 | Fowler | 340/347 P |
| 3,874,783 | 4/1975 | Cole | 350/96 B |
| 3,888,016 | 6/1975 | Fowler | 33/346 |
| 3,905,121 | 9/1975 | Takeda et al. | 33/361 |
| 3,923,370 | 12/1975 | Mostrom | 350/55 |

(List continued on next page.)

FOREIGN PATENT DOCUMENTS

| | | | |
|---|---|---|---|
| 0059770 | 9/1982 | European Pat. Off. | G01R 33/04 |
| 91309108 | 10/1991 | European Pat. Off. | |
| 0453347 | 10/1991 | European Pat. Off. | G01V 3/08 |

(List continued on next page.)

OTHER PUBLICATIONS

Ivan E. Sutherland, "A Head–Mounted Three Diminsional Display", Fall Join Computer Conference, 1968, pp. 757–763.

(List continued on next page.)

Primary Examiner—Ulysses Weldon
Attorney, Agent, or Firm—Bogle & Gates

[57] ABSTRACT

A sourceless orientation sensor having an azimuthal sensor which determines the azimuthal orientation relative to a planetary magnetic field, and a tilt sensor which determines the direction and magnitude of the displacement from vertical using the planetary gravitational field. The tilt sensor includes a transparent gas and a transparent viscous fluid in a spherical shell, a light emitting diode (LED) mounted at the top of the shell, and four photodetectors mounted at the bottom of the shell. As the tilt sensor is rotated the path of the light cone emanating from the LED and refracting at the gas/fluid interface is altered, thereby altering the intensity of light incident on the photodetectors. The magnitude of the light incident on the photodetectors is processed to provide the tilt angles. A thin transparent disk floats at the gas/fluid interface to damp surface waves caused by reorientation of the device. A time sequence of orientations of the sensor may be interpreted to provided a gesture sensing device.

1 Claim, 8 Drawing Sheets

U.S. PATENT DOCUMENTS

| | | | |
|---|---|---|---|
| 3,940,204 | 2/1976 | Withrington | 350/3.5 |
| 3,983,474 | 9/1976 | Kuipers | 324/43 R |
| 4,017,858 | 4/1977 | Kuipers | 343/100 R |
| 4,028,725 | 6/1977 | Lewis | 358/103 |
| 4,034,208 | 7/1977 | Vaeth et al. | 235/61.5 S |
| 4,042,957 | 8/1977 | Ellis | 358/109 |
| 4,048,653 | 9/1977 | Spooner | 358/104 |
| 4,060,910 | 12/1977 | Gell, Jr. | 33/324 |
| 4,095,348 | 6/1978 | Kramer | 33/363 K |
| 4,104,803 | 8/1978 | Hoeppel | 33/352 |
| 4,139,951 | 2/1979 | Cunard et al. | 33/362 |
| 4,146,970 | 4/1979 | Edwards | 33/363 K |
| 4,157,619 | 6/1979 | Zuvela | 33/352 |
| 4,179,741 | 12/1979 | Rossani | 364/457 |
| 4,257,062 | 3/1981 | Meredith | 358/81 |
| 4,269,476 | 5/1981 | Gauthier et al. | 350/174 |
| 4,310,849 | 1/1982 | Glass | 358/88 |
| 4,322,135 | 3/1982 | Freeman | 350/410 |
| 4,341,023 | 7/1982 | Marcus et al. | 33/363 K |
| 4,348,185 | 9/1982 | Breglia et al. | 434/43 |
| 4,361,384 | 11/1982 | Bosserman | 350/174 |
| 4,385,803 | 5/1983 | Ellis | 350/174 |
| 4,395,731 | 7/1983 | Schoolman | 358/88 |
| 4,398,799 | 8/1983 | Swift | 350/174 |
| 4,425,717 | 1/1984 | Marcus | 33/361 |
| 4,435,760 | 3/1984 | Kuno et al. | 364/444 |
| 4,437,113 | 3/1984 | Lee et al. | 358/93 |
| 4,439,157 | 3/1984 | Breglia et al. | 434/40 |
| 4,446,480 | 5/1984 | Breglia et al. | 358/104 |
| 4,465,347 | 8/1984 | Task et al. | 350/538 |
| 4,468,101 | 8/1984 | Ellis | 350/538 |
| 4,484,191 | 11/1984 | Vavra | 200/61.59 X |
| 4,497,034 | 1/1985 | Kuno et al. | 364/571 |
| 4,521,777 | 6/1985 | Nakamura et al. | 340/995 |
| 4,539,760 | 9/1985 | Marchent et al. | 33/356 |
| 4,546,550 | 10/1985 | Marchent et al. | 33/356 |
| 4,546,551 | 10/1985 | Franks | 33/356 |
| 4,550,984 | 11/1985 | Reymond | 350/404 |
| 4,559,555 | 12/1985 | Schoolman | 358/88 |
| 4,561,723 | 12/1985 | Hamano et al. | 350/331 R |
| 4,571,628 | 2/1986 | Thornton | 358/224 |
| 4,590,680 | 5/1986 | Hanchett et al. | 33/366 |
| 4,614,041 | 9/1986 | Darton et al. | 33/313 |
| 4,622,644 | 11/1986 | Hansen | 364/559 |
| 4,622,843 | 11/1986 | Hormel | 73/1 E |
| 4,636,866 | 1/1987 | Hattori | 358/236 |
| 4,641,931 | 2/1987 | Loy | 350/538 |
| 4,642,786 | 2/1987 | Hansen | 364/559 |
| 4,651,201 | 3/1987 | Schoolman | 358/98 |
| 4,652,870 | 3/1987 | Steward | 340/705 |
| 4,667,414 | 5/1987 | Russell | 33/364 |
| 4,680,866 | 7/1987 | Johnson et al. | 33/356 |
| 4,682,159 | 7/1987 | Davison | 345/158 |
| 4,694,583 | 9/1987 | Blaney | 33/361 |
| 4,695,129 | 9/1987 | Faessen et al. | 350/96.25 |
| 4,711,512 | 12/1987 | Upatnieks | 350/3.7 |
| 4,720,992 | 1/1988 | Hormel | 73/1 E |
| 4,737,972 | 4/1988 | Schoolman | 378/41 |
| 4,743,200 | 5/1988 | Welch et al. | 434/43 |
| 4,753,514 | 6/1988 | Kubik | 350/174 |
| 4,757,714 | 7/1988 | Purdy et al. | 73/597 |
| 4,761,056 | 8/1988 | Evans et al. | 350/174 |
| 4,763,990 | 8/1988 | Wood | 350/320 |
| 4,775,217 | 10/1988 | Ellis | 350/538 |
| 4,786,966 | 11/1988 | Hanson et al. | 358/108 |
| 4,791,729 | 12/1988 | Suda | 33/356 |
| 4,792,761 | 12/1988 | King et al. | 324/350 |
| 4,796,987 | 1/1989 | Linden | 351/158 |
| 4,797,736 | 1/1989 | Kloots et al. | 358/93 |
| 4,799,765 | 12/1989 | Ferrer | 350/174 |
| 4,805,988 | 2/1989 | Dones | 350/137 |
| 4,806,011 | 2/1989 | Bettinger | 351/158 |
| 4,807,202 | 2/1989 | Cherri et al. | 367/129 |
| 4,807,462 | 2/1989 | Al-Attar | 73/1 E |
| 4,826,287 | 5/1989 | Cook et al. | 350/174 |
| 4,839,809 | 6/1989 | Leighton et al. | 364/413.02 |
| 4,849,696 | 7/1989 | Brun et al. | 324/252 |
| 4,851,775 | 7/1989 | Kim et al. | 324/247 |
| 4,853,764 | 8/1989 | Sutter | 358/3 |
| 4,859,030 | 8/1989 | Rotier | 350/174 |
| 4,859,031 | 8/1989 | Berman et al. | 350/174 |
| 4,867,551 | 9/1989 | Perera | 351/158 |
| 4,869,575 | 9/1989 | Kubik | 350/174 |
| 4,874,214 | 10/1989 | Cheyason et al. | 350/3.7 |
| 4,874,235 | 10/1989 | Webster | 351/201 |
| 4,884,137 | 11/1989 | Hanson et al. | 358/108 |
| 4,884,219 | 11/1989 | Waldren | 364/514 |
| 4,897,715 | 1/1990 | Beamon | 358/93 |
| 4,900,133 | 2/1990 | Berman | 350/346 |
| 4,902,083 | 2/1990 | Wells | 350/6.6 |
| 4,902,116 | 2/1990 | Ellis | 350/501 |
| 4,902,120 | 2/1990 | Weyer | 351/158 |
| 4,904,049 | 2/1990 | Hegg | 350/96.27 |
| 4,930,888 | 6/1990 | Freisleben et al. | 356/152 |
| 4,932,731 | 6/1990 | Suzuki et al. | 350/3.7 |
| 4,933,755 | 6/1990 | Dahl et al. | 358/88 |
| 4,934,773 | 6/1990 | Becker | 350/6.6 |
| 4,945,305 | 7/1990 | Blood | 324/207.17 |
| 4,952,024 | 8/1990 | Gale | 350/143 |
| 4,953,305 | 9/1990 | Van Lente et al. | 33/356 |
| 4,961,625 | 10/1990 | Wood et al. | 350/174 |
| 4,961,626 | 10/1990 | Fournier et al. | 350/174 |
| 4,963,827 | 10/1990 | Popovic et al. | 324/251 |
| 4,968,123 | 11/1990 | Fournier et al. | 350/538 |
| 4,969,714 | 11/1990 | Fournier et al. | 353/174 |
| 4,969,724 | 11/1990 | Ellis | 350/503 |
| 4,970,589 | 11/1990 | Hanson et al. | 358/108 |
| 4,972,146 | 11/1990 | Eckardt et al. | 324/255 |
| 4,972,593 | 11/1990 | Dahlen et al. | 33/356 |
| 4,982,278 | 1/1991 | Dahl et al. | 358/88 |
| 4,983,014 | 1/1991 | Nattermann et al. | 350/96.24 |
| 4,984,179 | 1/1991 | Waldern | 364/514 |
| 4,988,981 | 6/1991 | Zimmerman et al. | 395/158 |
| 4,993,790 | 2/1991 | Vick | 350/3.73 |
| 4,995,165 | 2/1991 | Daniels | 33/361 |
| 5,003,300 | 3/1991 | Wells | 340/705 |
| 5,005,213 | 4/1991 | Hanson et al. | 455/617 |
| 5,019,828 | 5/1991 | Schoolman | 342/457 |
| 5,034,809 | 7/1991 | Katoh | 358/88 |
| 5,035,473 | 7/1991 | Kuwayama et al. | 350/3.7 |
| 5,039,198 | 8/1991 | VanBeek | 385/117 |
| 5,046,260 | 9/1991 | Welhausen | 33/356 |
| 5,046,827 | 9/1991 | Frost et al. | 359/54 |
| 5,050,966 | 9/1991 | Berman | 359/38 |
| 5,053,755 | 10/1991 | Smith et al. | 340/705 |
| 5,059,958 | 10/1991 | Jacobs et al. | 345/159 |
| 5,068,645 | 11/1991 | Drumm | 3445/159 |
| 5,079,845 | 1/1992 | Childers | 33/363 K |
| 5,081,542 | 1/1992 | Efron et al. | 359/41 |
| 5,089,903 | 2/1992 | Kuwayama et al. | 359/15 |
| 5,091,697 | 2/1992 | Roth et al. | 324/253 |
| 5,091,719 | 2/1992 | Beamon | 340/705 |
| 5,123,726 | 6/1992 | Webster | 351/201 |
| 5,124,821 | 6/1992 | Antier et al. | 359/14 |
| 5,129,716 | 7/1992 | Holakovszky et al. | 351/50 |
| 5,130,794 | 7/1992 | Ritchey | 358/87 |
| 5,138,555 | 8/1992 | Albrecht | 364/424.06 |
| 5,142,655 | 8/1992 | Drumm | 379/52 |
| 5,144,294 | 9/1992 | Alonzi et al. | 340/825.49 |
| 5,151,722 | 9/1992 | Massof et al. | 351/158 |
| 5,157,841 | 10/1992 | Dinsmore | 33/361 |
| 5,162,828 | 11/1992 | Furness et al. | 353/122 |

| | | | |
|---|---|---|---|
| 5,162,928 | 11/1992 | Taniguchi et al. | 359/13 |
| 5,166,778 | 11/1992 | Beamon | 358/3 |
| 5,170,153 | 12/1992 | Migozzi et al. | 340/705 |
| 5,184,231 | 2/1993 | Ellis | 359/13 |
| 5,187,871 | 2/1993 | McDermott | 33/354 |
| 5,189,512 | 2/1993 | Cameron et al. | 358/93 |
| 5,192,960 | 3/1993 | Komamura | 351/41 |
| 5,198,628 | 3/1993 | Bitko | 200/61.52 X |
| 5,198,928 | 3/1993 | Chauvin | 359/465 |
| 5,200,844 | 4/1993 | Suvada | 359/40 |
| 5,231,379 | 7/1993 | Wood et al. | 340/705 |
| 5,231,483 | 7/1993 | Sieber et al. | 358/125 |
| 5,239,264 | 8/1993 | Hawks | 324/253 |
| 5,255,211 | 10/1993 | Redmond | 364/578 |
| 5,276,471 | 1/1994 | Yamauchi et al. | 351/153 |
| 5,277,985 | 1/1994 | DeMenthon | 364/559 |
| 5,278,680 | 1/1994 | Karasawa et al. | 359/40 |
| 5,278,957 | 1/1994 | Schoolman | 345/8 |
| 5,282,318 | 2/1994 | Steiner | 33/355 R |
| 5,287,119 | 2/1994 | Drumm | 345/158 |
| 5,287,437 | 2/1994 | Deering | 395/127 |
| 5,293,271 | 3/1994 | Merritt et al. | 359/858 |
| 5,300,942 | 4/1994 | Dolgoff | 345/32 |
| 5,303,085 | 4/1994 | Rallison | 359/631 |
| 5,305,244 | 4/1994 | Newman et al. | 364/708.1 |
| 5,321,416 | 6/1994 | Bassett et al. | 364/8 |
| 5,322,441 | 6/1994 | Lewis et al. | 434/307 |
| 5,323,174 | 6/1994 | Klapman et al. | 345/156 |
| 5,327,175 | 7/1994 | Kim | 348/526 |
| 5,331,149 | 7/1994 | Spitzer et al. | 250/221 |
| 5,334,991 | 8/1994 | Wells et al. | 345/8 |
| 5,335,299 | 8/1994 | Atkinson | 382/56 |
| 5,347,400 | 9/1994 | Hunter | 359/815 |
| 5,351,005 | 9/1994 | Rouse et al. | 324/252 |
| 5,353,042 | 10/1994 | Klapman et al. | 345/156 |
| 5,365,671 | 11/1994 | Yaniger | 33/366 |
| 5,373,857 | 12/1994 | Travers et al. | 128/782 |
| 5,381,603 | 1/1995 | Lee | 33/355 R |
| 5,383,053 | 1/1995 | Hegg et al. | 359/486 |
| 5,388,276 | 2/1995 | Holmes | 2/421 |
| 5,392,158 | 2/1995 | Tosaki | 359/633 |
| 5,412,619 | 5/1995 | Bauer | 367/128 |
| 5,422,715 | 6/1995 | Clarke | 356/141.3 |
| 5,451,976 | 9/1995 | Ito | 345/8 |

FOREIGN PATENT DOCUMENTS

| | | | |
|---|---|---|---|
| 0461942 | 12/1991 | European Pat. Off. | G09B 9/32 |
| 0479605 | 4/1992 | European Pat. Off. | G09B 9/30 |
| 0477888 | 4/1992 | European Pat. Off. | G01S 17/87 |
| 0515175 | 11/1992 | European Pat. Off. | G02B 27/00 |
| 0519630 | 12/1992 | European Pat. Off. | G01C 21/20 |
| 2517916 | 6/1983 | France | H04N 9/54 |
| 2636134 | 3/1990 | France | G01C 21/20 |
| 2660428 | 10/1991 | France | G01C 17/02 |
| 224691 | 7/1910 | Germany | 34 I 20 |
| 1623555 | 5/1971 | Germany | G01C 17/30 |
| 2536140 | 4/1976 | Germany | G01C 17/10 |
| 3532730 | 3/1987 | Germany | A16B 1/04 |
| 3628458 | 2/1988 | Germany | H04N 1/20 |
| 36444681 | 7/1988 | Germany | G01C 21/08 |
| 3708582 | 12/1988 | Germany | G01C 21/08 |
| 4102896 | 8/1992 | Germany | G01P 13/00 |
| 4225589 | 2/1994 | Germany | G09F 9/00 |
| 59-117889 | 7/1984 | Japan | H04N 9/54 |
| 59-219092 | 12/1984 | Japan | H04N 9/54 |
| 62-272698 | 11/1987 | Japan | H04N 13/4 |
| 63-82192 | 4/1988 | Japan | H04N 13/2 |
| 63-177689 | 7/1988 | Japan | H04N 13/4 |
| 1-61723 | 3/1989 | Japan | G02B 27/22 |
| 5-46161 | 2/1993 | Japan | G09G 5/36 |
| 6-59217 | 3/1994 | Japan | G02B 27/28 |
| 61-10014 | 4/1994 | Japan | C01B 25/45 |
| 1010641 | 4/1983 | U.S.S.R. | G09B 9/04 |
| 1218416 | 3/1986 | U.S.S.R. | G09B 9/04 |
| 1399802 | 5/1988 | U.S.S.R. | G09B 9/04 |
| 1485015 | 6/1989 | U.S.S.R. | G01C 17/00 |
| 1560091 | 4/1990 | U.S.S.R. | A16B 5/103 |
| 1607775 | 11/1990 | U.S.S.R. | A16B 5/11 |
| 1616603 | 12/1990 | U.S.S.R. | A16B 5/103 |
| 1700573 | 12/1991 | U.S.S.R. | G09B 9/04 |
| 2093591 | 9/1982 | United Kingdom | G01C 17/28 |
| 2117609 | 10/1983 | United Kingdom | G09B 9/00 |
| 2143948 | 2/1985 | United Kingdom | G01C 1/00 |
| 2157426 | 10/1985 | United Kingdom | G01B 11/26 |
| 2164748 | 3/1986 | United Kingdom | G01C 17/08 |
| 2177512 | 1/1987 | United Kingdom | G01C 17/28 |
| 2195180 | 3/1988 | United Kingdom | G01C 17/04 |
| 2266385 | 10/1993 | United Kingdom | G02B 23/10 |
| 2270775 | 3/1994 | United Kingdom | G02B 27/02 |
| 2279201 | 12/1994 | United Kingdom | H04R 1/10 |
| 2281846 | 3/1995 | United Kingdom | A45F 3/00 |
| WO84/01680 | 4/1984 | WIPO | H04N 5/64 |
| WO92/01276 | 1/1992 | WIPO | G09B 9/10 |
| WO92/03756 | 3/1992 | WIPO | G02B 27/00 |
| WO92/15078 | 9/1992 | WIPO | G09B 9/00 |
| WO92/18925 | 10/1992 | WIPO | G06F 3/00 |
| WO92/21117 | 11/1992 | WIPO | G09B 9/34 |
| 8O93/23783 | 1/1993 | WIPO | G02B 27/00 |
| WO94/11855 | 5/1994 | WIPO | G09G 3/02 |
| WO94/14152 | 6/1994 | WIPO | G09G 3/02 |
| WO94/24658 | 10/1994 | WIPO | G09G 3/02 |
| WO95/10106 | 4/1995 | WIPO | G09G 3/02 |
| WO95/10061 | 4/1995 | WIPO | G02B 26/10 |

OTHER PUBLICATIONS

Myron W. Kruger, Artificial Reality, Addison–Wesley Publishing Co., 1983, pp. 67–68.

James D. Foley, "Intrfaces for Advanced Computing," Scientific American, Oct. 1987, pp. 127–135.

"Airlines Weigh Benefits, Cost of At–Seat Video", *Aviation Week & Space Technology*, Aug. 15, 1994, pp. 44–45.

Aley et al., "A Sourceless Orientation Sensor", *Sensors, Nov. 1993, pp. 55.*

Analog Devices, Inc., "Analog Devices", specifications, 1995, pp. 1, 3, 5, 7, 9, 11, 13, 15, 17, 19.

Antonoff, "Living in a Virtual World", *Popular Science*, Jun. 1993, pp. 83–86, 124–125.

Applewhite, "Position Tracking in Virtual Reality", *Beyond the Vision: the technology, research, and business of virtual reality*, Proceedings of Virtual Reality '91, the Second Annual Conference on Virtual Reality, Artificial Reality, and Cyberspace, 1991 San Francisco, pp. 1–8.

Assenheim et al., "Large–Screen–Projection, Avionic, and Helmet–Mounted Displays", Proceedings, The International Society for Optical Engineering, Feb. 26–28, 1991 vol. 1456, pp. 179–190.

Benton, "Practical Holography VIII", Proceedings, The International Society for Optical Engineering, Feb. 7–9, 1994, vol. 2176, pp. 241 –248.

Black, "Digi–Compass, Is your house rotating . . . what about your computer?", *Radio Electronics*, Nov. 1989, pp. 43–45, 50–51, 82.

Boyle, "Eye–ball control", *Interavia*, Sep. 1979, p. 874.

Bridges, "Three–dimensional displays in the future flight station", *SPIE*, vol. 507, 1984, pp. 143–154.

Brooks, "Head Sensor Ideas", Oxford University, Nov. 22, 1991.

Burley, et al., "A Full-color wide-field-of-view holographic helmet-mounted display for pilot/vehicle interface development and human factors studies", *SPIE*, vol. 1290 Helmet-Mounted Displays II (1990), pp. 9–15.

Caristi, "Build An Electronic Compass", *Radio Electronics*, Jun. 1991, pp. 39–42.

Carr, "Is Virtual Reality Virtually Here?", *Training & Development*, Oct. 1992, pp. 37–41.

Casey et al., "Survey of Available Head Tracking Technology", *PCVR*, vol. 1, Issue 5, Sep./Oct. 1992, pp. 2–11.

Clarke, "Cheap Head Orientation Sensors", University of Central Florida, Nov. 25, 1991.

Clarke, "Keeping Your Virtual Feet on the Ground", *PCVR*, Issue 13, Jan./Feb. 1994, pp. 13–24.

Deering, "High Resolution Virtual Reality", *Computer Graphics*, 26, 2, Jul. 1992, pp. 195, 197, 201.

Driscoll et al., *Handbook of Optics*, McGraw-Hill Book Company, 1978, pp. 13–16.

"Electrical Devices", Dinsmore No. 1525 Analog Sensor, *R & D Magazine*, Oct. 1991.

Extance et al., "GaAs Magnetic Field Sensors" *IEEE*, 1985, pp. 304–307.

Farmer, "The right solution to the right problem . . . now", *Comdex Daily*, Nov. 15, 1994, p. 4.

Ferrin, "Survey of helmet tracking technologies", *SPIE*, vol. 1456, 1991, pp. 86–94.

Fischer, "Fundamentals and Optics for Head Mounted Displays", Photonics West '95, Feb. 4–10, 1995.

Fischer et al., "Living in a Virtual World", *Byte*, Jul. 1990, pp. 215–216, 218, 220–221.

Garner, "Forum Building the Smart Compass", Oshkosh 1986, Hampton, Virginia, 1986.

Grenoble, "Sensor and logic form digital compass", Dinsmore No. 1490 Digital Sensor, *EDN*, Dec. 6, 1990.

Honeywell., "One-Axis Magnetoresistive Microcircuit HMC 1001", specifications, Mar. 1995.

Honeywell, "Two-Axis Magnetoresistive Microcircuit HMC 1002", specifications, Mar. 1995.

Horn, "Seeing the invisible", *U.S. News & World Report*, Jan. 28, 1991, pp. 56–58.

James, "Goggles Brighten Dark Subway", *The New York Times*, Apr. 10, 1992.

Jones et al., "Evaluation of conformal and body-axis attitude information for spatial awareness", *SPIE*, vol. 1695 Helmet-Mounted Displays III (1992), pp. 146–153.

Krueger, *Artifical Reality II*, 1991 Addison-Wesley Publishing Company, Inc. pp. 66–82, 102–116, 130–149, 179–182, 237–239, 267–279.

Lancaster, "Hardware Hacker, A solid-state digital compass", *Radio-Electronics*, Dec. 1988, pp. 33–36, 96.

Liu et al., "A High Accuracy Magnetic Heading System Composed of Flexgate Magnetometers and a Microcomputer", pp. 148–152.

Linquist, "Demo 92: From the practical to the playful", *Computerworld*, Feb. 10, 1992, p. 37.

Merritt et al., "Steroscopic Displays and Applications II", *SPIE*, vol. 1457, pp. 327–343.

Merritt et al., "Steroscopic Displays and Applications III,", *SPIE*, vol. 1669, 1992, pp. 84–89.

Meyer et al., "A Survey of Position Trackers", *Presence*, vol. 1 No. 2, Spring 1992, pp. 173–200.

Micronta, Service Manual, Flux-Gate Electronic Compass Catalog No. 63–641, 1992, pp. 1–12.

Miller, "Online Interviews Dr. Thomas A. Furness III, Virtual Reality Pioneer", *Online*, Nov. 1992, pp. 14–15, 17–18, 20–22, 24–27.

Noble, "Electronic fluxgate compass", *Electronics World & Wireless World*, Jan. 1992.

Ono-Sendai Corporation, Specifications, Dec. 22, 1993.

Peterson, "Magnetoresistive sensors for navigation", *IMechE*, C391/028, 1989, pp. 87–92.

Philips Semiconductors, "Magnetic field sensor", Product specification, KMZ10B, Oct. 1994, pp. 61, 64.

Pope, "Say ahhh! Videos help you relax", *The Times-Picayune*, Oct. 25, 1994, pp. 1, A–6.

Primdahl, "The fluxgate magnetometer", *Journal of Physics E: Scientific Instruments*, vol. 12, No. 4, Apr. 1979, pp. 241–253.

Raab et al., "Magnetic Position and Orientation Tracking System", *IEEE*, vol. AES–15, No. 5, Sep. 1979, p. 709–718.

Raman, "Magnetic heading sensor", *Electronics & Wireless World*, Oct. 1988, pp. 1023–1024.

Rotier, "Optical Approaches to the Helmet Mounted Display", *SPIE*, 1989, vol. 1116, pp. 14–17.

Siggraph, *Nikkei Electronics*, Aug. 22, 1994, pp. 13–14.

Smith, "VA to Test PC System for Handicapped", *Government Computer News*, vol. 9, No. 6, Mar. 19, 1990, pp. 114, ISSN 0738–4300.

Starks, "Stereoscopic video and the quest for virtual reality: an annotated bibliography of selected topics", *SPIE*, vol. 1457 Steroscopic Displays and Applications II(1991), pp. 327–343.

Stewart, "Through the looking glass into an artificial world—via computer", *Smithsonian*, vol. 21, No. 10, Jan. 1991, pp. 36–45.

"Survey of Head Mounted Displays", *Real Time Graphics*, Aug. 1994, vol. 3, No. 2, pp. 1, 8–12.

Travers, "Consumer Markets–The Cybermax HMD", *Virtual Reality*, 1994.

*Video Review*, May/Jun. 1993, p. 52.

Virtual I/O, "i-glasses!", *Twice CES Daily*, Jan. 6, 1995, p. 30.

Virtual I/O, Specifications, *Virtual Reality World*, Nov./Dec. 1994, p. 11.

Virtual I/O, *VR News*, Aug./Sep. 1994, p. 17.

"Virtual Reality Resource Guide", *AI Expert*, Aug. 1992, pp. 42–47.

Virtual Vision, Inc. *Video Review*, May/Jun. 1993, p. 22.

*VR News*, Dec. 1994, vol. 3, Issue 10, pp. 4, 8, 12.

Zenith Electronics Corp. "Virtual Sega", *Video Review*, May/Jun. 1993, p. 25.

FIG. 17

SOURCELESS ORIENTATION SENSOR

BACKGROUND OF THE INVENTION

The present invention relates generally to position or orientation sensors, and more particularly to orientation sensors used to provide input to a computer system, manipulate a virtual reality environment in a computer, and control sensory impressions conveyed to the user of the computer.

There are various input devices known for controlling a computer in response to the orientation of a body part of a user. The most common in use is the conventional "mouse" device, in the form of a hand-sized housing which is moved over a flat desktop. Motion over the desktop is sensed by means of a mechanically rotating ball or optically reflective sensor, and the digital data which is generated translates into a corresponding orientation signal which determines the location of the user's hand and is input to the computer. Other positioning devices include the graphics input tablet, consisting of a flat sensor pad and a hand-held pointing stylus, which translates the analog motion of the pointing stylus into digitized data. Still other devices rely on focused light sources, held by the user or fixed on the user's person, as on a pilot's helmet. As the user aims the light beam, sensors mounted around a display screen track the movement of the beam and translate this movement into a corresponding orientation signal to input into the computer.

Devices such as those discussed above are basically effective, although they suffer from certain disadvantages. Most input devices require a fixed, generally level surface upon which to operate, or must operate in conjunction with a stationary sensor of some type; that is, motion is sensed with respect to a fixed medium and positional data signals are generated and presented to a computer for translation into a corresponding orientation signal. The need for a fixed surface or stationary sensor constrains how the user may interact with the display device. The user must normally sit close to a display screen and be provided with ample level desk space for placement of the graphics tablet or movement of the "mouse." In the case of the stationary sensor, the user must confine movement to keep the light beam within range of the sensor array and aimed appropriately. These sensors which depend on the sensing with respect to some fixed object are source-dependent. It is desirable to use a sourceless sensor, that is a sensor which does not depend on the existence of some external fixed object which is used to determine the orientation of the sensor.

In U.S. Pat. No. 5,068,645 (Drumm) a sourceless orientation sensor operates on the principle of refracted light beams. The orientation sensor includes a hollow spherical housing containing a gaseous medium and a gaseous medium, each with a different index of refraction and each filling the housing to the one-half level. The sensor uses light source-photodetector pairs. The light source in the form of an LED and photodetector of each pair are mounted on opposite sides of the spherical housing. As the housing is rotated, the angle of incidence of the focused light beam from the LED on the boundary layer changes, causing the refraction angle and therefore the light intensity on the photodetector to change. A pair of coplanar light sources and photodetectors are located 45° from the horizontal plane. The output voltage for the photodetectors are compared, and the resultant output indicates the direction and magnitude of tilt. With two pairs of opposing light sources and photodetectors, the direction and magnitude of tilt in two axes can be determined.

The orientation sensor of U.S. Pat. No. 5,068,645 suffers several drawbacks. First, the sensor is only capable of measuring the tilt of the housing away from the vertical axis, it cannot measure any azimuthal rotation. Second, the sensor has an effective range of tilt of only about 30°. Third, the sensor suffers from a "sloshing effect", in that when the housing is suddenly tilted, the liquid medium flows back and forth creating surface waves on the boundary surface. The uneven boundary surface refracts light differently and creates errors in the measured tilt angle.

The present invention overcomes the disadvantages of the prior art devices, such as the requirements of flat desktop or aiming of a light source, the inability to measure azimuthal angle, the limited range of tilt angle, and the "sloshing effect".

In accordance with the present invention, a novel input device is provided for an electronic device. The input device includes a sourceless orientation sensor which generates an electrical signal representative of the physical orientation of the device, without it being adjacent to any fixed reference object. The electrical orientation signal can be used to position and otherwise control a cursor on a display screen, to manipulate virtual objects in a virtual reality environment, to control the presentation of an image on a display screen, to send orientation information to storage, or to provide feedback for a robotic device.

The input device is in the form of a frame with an azimuthal orientation sensor and a tilt orientation sensor attached. The azimuthal sensor detects the magnitude of rotation of the frame about the vertical axis, and the tilt sensor detects the magnitude and direction of tilt of the frame away from the vertical axis. Thus complete information on the pitch, roll, and yaw of the frame is available.

The frame can be temporarily affixed to a body part of the user. In a preferred embodiment, the input device is a headset to be worn by a user. Wearing the device, the orientation information corresponding to head movements is input to the computer to change the display on a display screen.

The azimuthal orientation sensor operates on the principle of comparing the orientation of the sensor to the local magnetic field generated by a planet, and using the difference to determine an azimuthal angle. In the preferred embodiment the azimuthal orientation sensor includes a flux gate magnetometer and associated electronics to drive the magnetometer and detect signals from the magnetometer. The magnetometer includes a saturable core, and by driving the core to near its magnetic saturation, any additional local magnetic field causes flux to leak from the core. Two detection coils at right angles detect the flux leakage and thereby sense the direction of local magnetic field. As the azimuthal orientation sensor is rotated, the signals from the detection coils change.

It should be noted that as the sensor is tilted relative to the vertical, the projection of the core of the magnetometer onto a plane perpendicular to the magnetic field changes. Therefore the output from the azimuthal sensor output must be corrected for the tilt angle by a calculation of the aforementioned projection area. In the preferred embodiment this correction is implemented in hardware. Alternatively, the correction may be implemented in software by for instance generating a table of tilt angle versus projection area of the core. Another solution to this problem is to use an array of three magnetometers aligned along mutually perpendicular axes, whereby the magnetic field is generated as the vector sum of the three magnetometer outputs and the azimuthal angle of the magnetic field is easily determined.

The tilt orientation sensor operates on the principle of a light beam being refracted as it passes from one transparent medium to another. The orientation sensor includes a hollow spherical chamber disposed inside an opaque enclosure. The transparent chamber has a defined central axis passing through its center point. Contained within the chamber are two fluid media. The first medium is gaseous and the second medium is liquid, and each has a predetermined viscosity and a different index of refraction. The liquid medium fills the chamber to the one-half level and the boundary between the liquid and gas intersects the center point of the chamber. The liquid medium always flows to the bottom half of the spherical housing to maintain equilibrium.

A light source in the form of an LED is mounted next to the chamber in the housing to shine its maximum intensity along the central axis. A plurality of photodetectors in the form of phototransistors are mounted next to the chamber but spaced apart from the central axis. The light source emits a focused beam and the photodetectors receive the focused beam and generate an analog voltage representative of the intensity of the received beam.

When the focused beam emitted from the light source passes through the boundary between the gaseous and liquid media, refraction of the beam occurs at the boundary at an angle which is determined by the angle at which the incident light beam intersects the boundary. If the chamber is oriented so that the central axis of the incident light beam is perpendicular to the boundary, the light beam will not be refracted at all. If the photodetectors are spaced equally apart from the central axis, they will receive equal intensities of the light beam, and will generate equal signals. As the chamber is rotated with respect to the vertical axis, the angle from the vertical axis to the incident light beam will increase, and the refraction angle of the light beam will increase. As the refraction angle increases, the axis of maximum illumination will move toward one or the other of the photodetectors. Therefore, one photodetector receives a decreasing light intensity beam and generates a decreasing voltage while and another photodetector receives an increasing light intensity and generates an increasing voltage. The difference between the output voltage of the photodetectors is therefore representative of the angle at which the incident beam intersects the boundary between the two media.

In a preferred embodiment of the present invention, the tilt orientation sensor includes a light source and four photodetectors. Two photodetectors are located in one vertical plane which includes the central axis, and the other two photodetectors are located in a perpendicular vertical plane. The light source is mounted on the one side of the housing and the photodetectors are mounted on the opposite side. In the normal orientation of the sensor, the light source is located in the upper half of the spherical housing, near to the gaseous media. The photodetectors are located in the lower part of the spherical housing, near to the liquid media, each 64 degrees from the horizontal axis. The output voltages for each pair of photodetectors within the same plane are compared in a differential amplifier, and the resultant output of the differential amplifier indicates the direction of rotation as well as the magnitude.

Also in accordance with the present invention, a transparent rigid disk is placed inside the chamber. The disk has a density less than of the fluid and floats in the fluid near the boundary surface. The disk is smooth, and has an index of refraction close to that of the fluid. The transparent rigid disk provides a flat surface which does not undulate and thus reduces the "sloshing effect."

The output signals of the orientation sensor are converted into digital data and presented to an interface. The interface converts the digital data into a format useable by a computer. For example, the data may be formatted by the interface to simulate a cursor control device, and presented to a computer as control signals for positioning a cursor on a display screen. Alternately, it may be desirable for the computer to react to gestures performed by a user. The interface or the computer may be configured to sample the orientation signals at regular intervals, store the signals, assemble the signals to form a time based sequence of orientations, and analyze the sequence to generate a gesture signal.

An object of the present invention is to provide a sourceless azimuthal sensor for monitoring the azimuthal orientation of a user.

Another object of the present invention is to provide a sourceless orientation sensor for detection of three independent orientation angles.

Another object of the present invention is to provide a sourceless gesture sensor.

Another object of the present invention is to provide an orientation sensor which determines its orientation relative to a planet's magnetic and gravitational fields.

Another object of the present invention is to provide an orientation sensor which operates over a wide range of tilt angles.

Another object of the present invention is to provide an orientation sensor which can operate when subject to rapid reorientations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a computer input device for controlling a computer in response to the orientation of a body part of a user. The device attaches to the body part and consists of a sourceless azimuthal sensor for detecting the azimuthal orientation of the user, and an interface for translating electrical signals generated by the sensor into orientation signals for transmission to the computer.

The present invention will be better understood from the following description when considered in conjunction with the accompanying drawings, in which similar elements are numbered similarly.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

The present invention will be described in terms of the preferred embodiments. The preferred embodiments are apparatus for orientation sensing.

Figures 1, 2A, 2B, 2C:
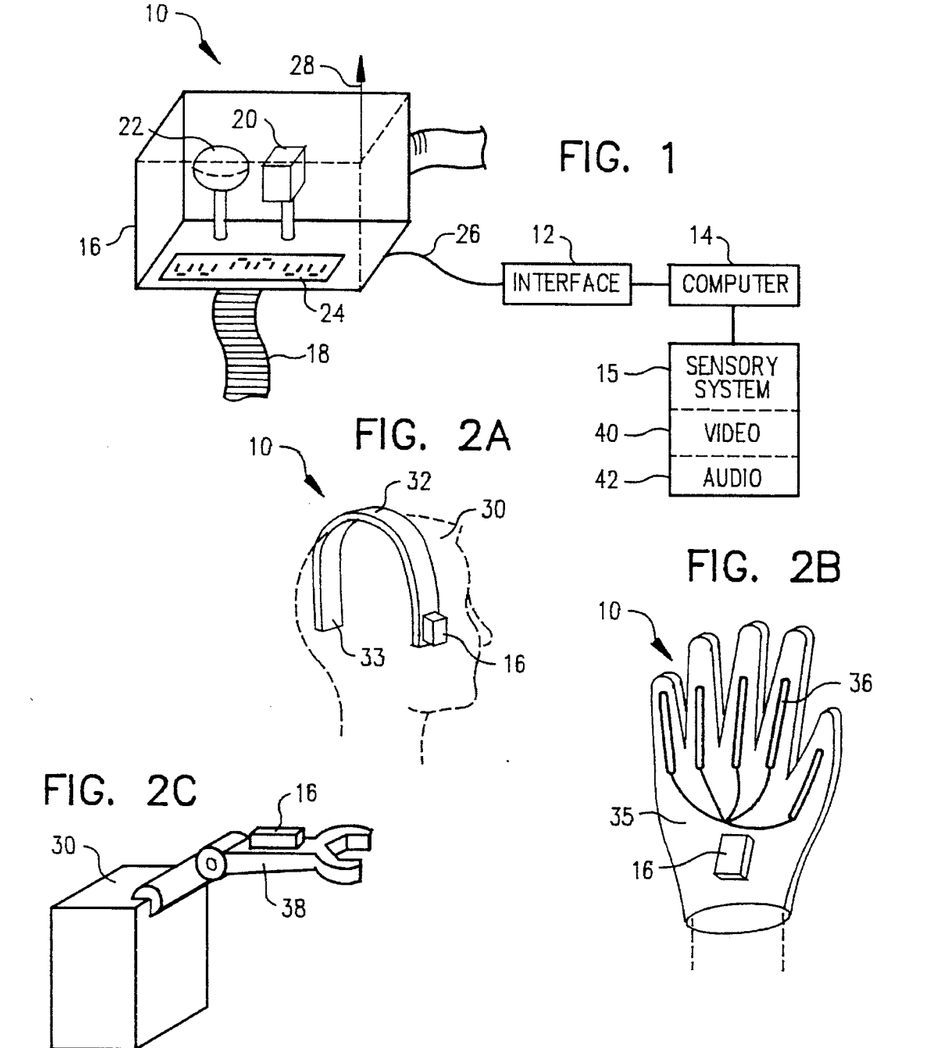
FIG. 1 is a simplified diagrammatic illustration of a computer system which uses the orientation sensor of the present invention.
FIGS. 2A, 2B and 2C illustrate several different embodiments in which the sensor unit of the present invention is attached to a selected body part of a user.

FIG. 1 illustrates an electronic system which embodies the input device of the present invention. The system includes a sensor unit 10, an interface 12, and a computer 14. By computer in this context it is generally meant any electronic apparatus which can utilize a signal corresponding to orientation of a user, such as standard computers, feedback systems, targeting displays, and tracking devices. The system also often includes a sensory system 15, such as a display screen, which provides sensory impressions to the user.

The sensor unit 10 is illustrated schematically in the form of a frame 16, shown here in the form of a box. Frame 16 may be provided with some means for attachment to a selected body part of the user. This attachment may, for example, be in the form of Velcro® straps 18. The sensor unit 10 includes at least an azimuthal orientation sensor 20, shown here as a cube, which provides a signal that is related to the azimuthal angle of the sensor. Sensor unit 10 may also include a tilt orientation sensor 22, shown here as a sphere, which provides an electrical signal that is related to the angle of tilt of the sensor as determined in two axes. Azimuthal sensor 20 and tilt sensor 22 are attached to frame 16 so that the sensors will maintain a fixed orientation with respect to each other and with respect to the frame 16. When frame 16 is attached with straps 18 to a selected body part of the user, sensor unit 10 will provide signals representative of the orientation of that body part. Tilt sensor 22 detects rotations of the frame axis 28 from vertical, and azimuthal sensor 20 detects rotations of the frame 16 about the frame axis 28.

A printed circuit board 24 contains the electronic circuitry for the sensor unit 10. More specifically, this includes analog circuitry for the operation of the orientation sensors 20 and 22, an analog to digital converter for transformation of the output signals of the sensors 20 and 22 to digital form, and digital circuitry for communication with the interface 12. A cable 26 carries digitized signals from the sensor unit 10 to the interface 12. Interconnection wiring between the printed orientation sensors 20 and 22, circuit board 24, and cable 26, are not shown in FIG. 1 for simplicity. It should be noted that one or both of orientation sensors 20 or 22 could be directly attached to printed circuit board 24 which would then serve as frame 16. Alternately, parts of circuit board 24 could be located with interface 12.

The cable 26 exits sensor unit 10 so that it will cause minimum interference during operation of the sensor unit 10. Although direct cabling is used in the preferred embodiment to keep the sensor unit 10 inexpensive, it is within the scope of the present invention to link the sensor unit 10 to the interface 12 by means of conventional miniature wireless transmitter or transceiver technology. It is also within the scope of the present invention for the interface 12 to be included in the circuitry of sensor unit 10, or alternately to be included as circuitry in computer 14 or as a look-up table in a program in computer 14.

The interface 12 contains a programmed microcontroller for receiving digitized signals from the sensor unit 10 and translating those signals into control signals which can be interpreted by the computer 14. If the sensor unit 10 is to be used for cursor control, the interface 12 can be programmed to simulate the operation of a standard cursor control device, and provide a standard RS-232C output to a conventional digital computer 14. The computer input device may thus simulate the functioning of a graphics input tablet, "mouse", or joystick. A user can therefore manipulate displayed data, make menu selections, or input graphic information on a display screen.

Turning now to FIGS. 2A–2C, various different uses of the sensor unit 10 are shown. As shown in FIG. 2A, the user 30 conveniently wears frame 16 in the manner of a conventional audio headset. The device thus senses the orientation of the user's cranium, including rotation of the head from left-to-right, as well as tilt from forward-to-back or side to side, or combinations of the rotation and tilt. Frame 16 is attached to headband 32, preferably molded of durable plastic and having a shape and dimensions to fit comfortably around the head of the computer user. The headband 32 includes a soft foam insert 33 for supporting the headband 32 in a manner which is comfortable to the user. These considerations for user comfort are especially important when the anticipated user may wear the device for extended period of time.

As shown in FIG. 2B, the user conveniently wears the sensor unit 10 in the manner of a conventional glove. The device thus senses the orientation of the user's hand as it is twisted, tilted and rotated. Frame 16 is attached to glove 35.

Glove 35 may also include flex sensors 36 to measure the positions of the fingers, and this additional information can be used to provide a complete description of the movement of the user's hand.

As shown in FIG. 2C, the user 30 may also be a robot. In this embodiment, the frame 16 is attached to robotic arm 38. The electronic system would include a feedback device which would allow the robot to adjust the position of its arm 38 to manipulate objects in the real world.

The azimuthal orientation sensor 20 and tilt orientation sensor 22, which are major components of the present invention, will be described in considerable detail. The orientation sensors 20 and 22 are fixedly mounted on the frame 16 as shown in FIG. 2A–2C.

It is to be emphasized that the user of the invention can be a human being, an animal, a robot, a vehicle, a package or any object that may change orientation. Attached to humans or animals, the input device may be useful to track the orientation for physiological studies. Attacked to robots or packages, the input device may be useful to track orientation on an automated assembly line.

Figure 3A:
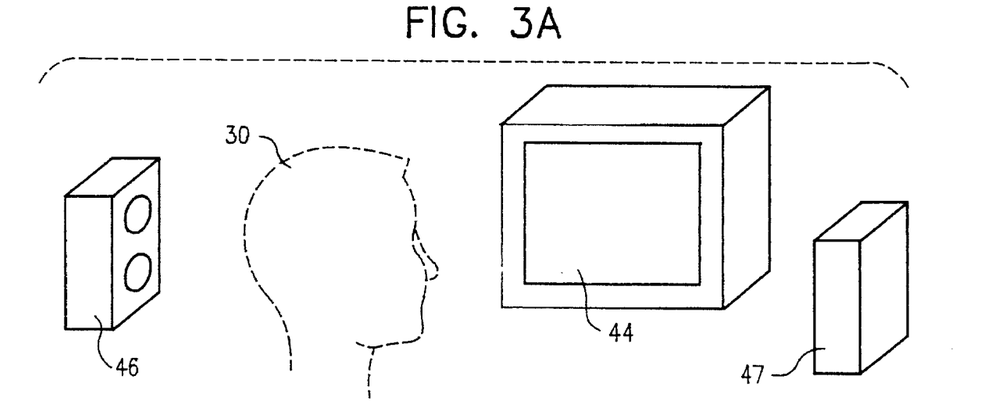
FIGS. 3A and 3B show a separated and an affixed embodiment of an audio-visual system associated with the present invention.
Figure 3B:
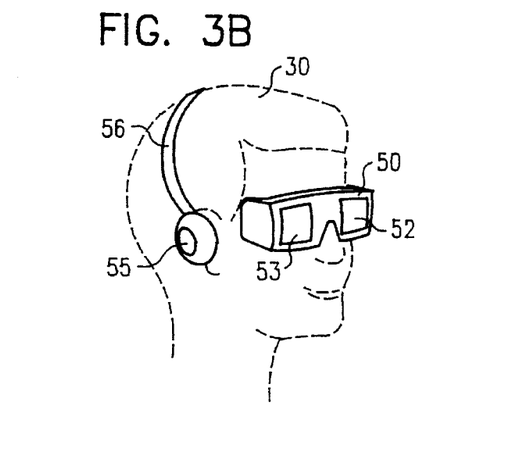
Figure 4:
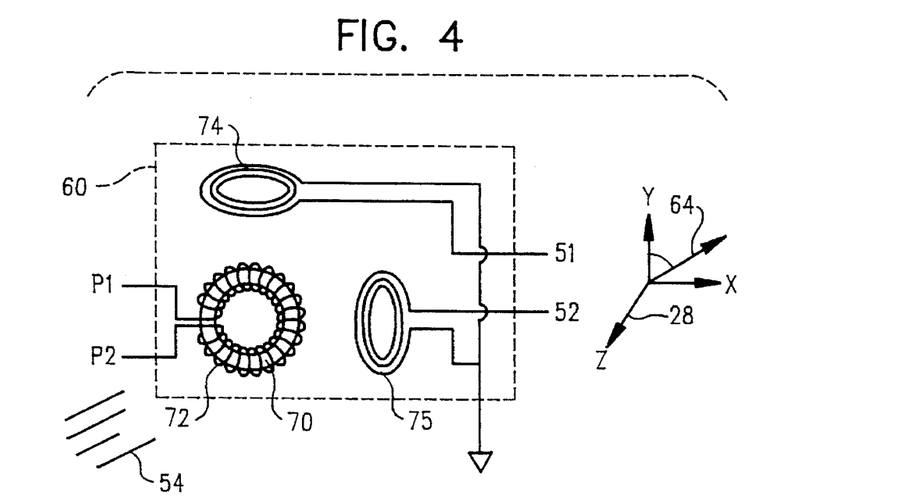
FIG. 4 is a schematic diagram of the flux gate magnetometer used in the azimuthal orientation sensor.

Turning now to FIGS. 1, 3A and 3B, the use of the computer input device 10 to control a general sensory system 15 is shown. In particular FIGS. 3A and 3B show an audio-visual system usually associated with a computer. The sensory system 15 may include a visual subsystem 40, and audio subsystem 42. While not shown, it should be understood that sensory system 15 could include a tactile system such as a glove or body suit with actuators to exert pressure against the user's body.

In the preferred embodiment shown in FIG. 3A, sensory system 15 is separate from the user 30. The visual subsystem 40 is a single video display 44, such as a standard cathode ray tube. Any screen type may be used for visual display 44, including liquid crystal or projection displays. Audio system 42 includes dual speakers 46 and 47 for stereo sound. This embodiment is preferred for video computer games. For example, when combined with the headset shown in FIG. 2A, by slightly rotating the head left or right, the user would cause the video display 44 to scroll left or right to reveal new regions of the game.

In the alternate embodiment shown in FIG. 3B, sensory system 15 is affixed to the user 30. The visual system 40 can be a dual display mounted in goggles 50 for attachment to the user's head. Goggles 50 can include left and right liquid crystal displays 52, 53, or other convenient small display units. Sensory system 15 can provide slightly different images to liquid crystal displays 52, 53 to provide a stereoscopic visual system. The audio system 42 includes earphones 55 on headset 56 for stereo sound. Visual system 40, audio system 42, and sensor unit 10 can all be incorporated into a single helmet. This embodiment is preferred for virtual reality environments such as a targeting system in which the visual and audio would alter to emulate the orientation of the user's head within the virtual reality environment.

Azimuthal Orientation Sensor

Figure 5:
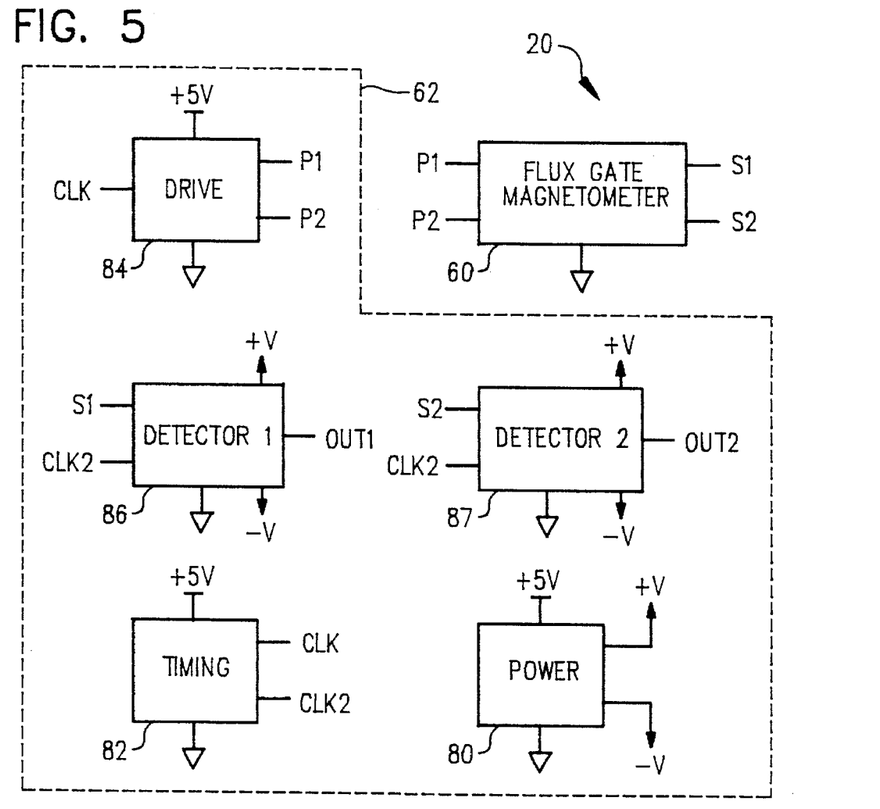
FIG. 5 is a block circuit diagram of the azimuthal orientation sensor used in the present invention.

Of great importance to the present invention is azimuthal sensor 20. FIGS. 4 through 8 illustrate the structure and operation of the azimuthal orientation sensor 20. Azimuthal orientation sensor 20 operates on the principle of comparing the orientation of the sensor to the Earth's local magnetic field, and using the difference to determine the azimuthal angle. In the preferred embodiment, as shown in FIG. 5, azimuthal orientation sensor 20 includes flux gate magnetometer 60 and associated electronics 62.

Returning now to FIG. 4, flux gate magnetometer 60 produces a signal indicative of the local magnetic field 64. Flux gate magnetometer 60 consists of a saturable core 70 surrounded by excitation coil 72. In the preferred embodiment, the core 70 is a torroid. Near core 70 are detection coils 74 and 75 which are situated at right angles to each other and the plane of the torus. It should be noted that other arrangements of the components of the magnetometer 60, such as three linear cores arranged at right angles, are well known to those of skill in the art, and these embodiments are intended to be included in the invention. Core 70 may be a ferrous metal and coil 72 may be copper. The coil 72 is charged to excite the core 70 to near its magnetic saturation. The exact strength and frequency at which saturation occurs varies depending on the size of the torroid. In the present invention the core 70 is a 1-inch diameter torroid which saturates at a frequency of approximately 2 kHz and a peak to peak voltage of approximately 8 volts. If there is any additional external magnetic field 64, flux leaks from the core 70 and may be detected by detection coils 74 and 75 at a frequency twice that of the driving frequency of the core. By driving the core to the saturation point, the coils 74 and 75 can detect the Earth's local magnetic field 64. The phase and relative strength of the signals S1, S2 from the coils 74, 75 may be used to determine the orientation of the azimuthal sensor relative to the direction of the local magnetic field 64.

Figure 6A:
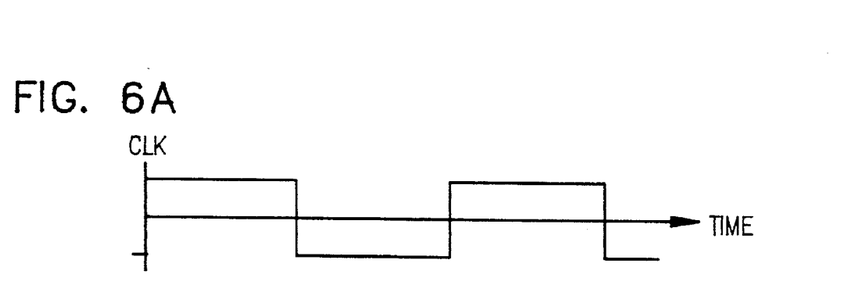
FIGS. 6A and 6B illustrate clock signals produced by the timing circuit of the azimuthal orientation sensor.
Figure 6B:
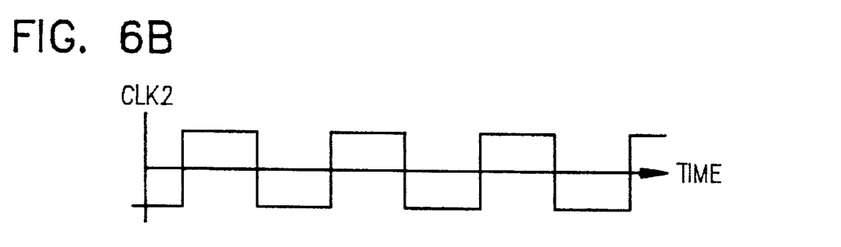

Turning now to FIG. 5, a block diagram of the associated electronics 62 of flux gate magnetometer 60 is shown. Associated electronics 62 can be part of circuit board 24 or located separate from the sensor unit 10. Associated electronics 62 includes five important circuits. Power circuit 80 provides steady DC voltages of +5 volts, +V and −V (V is about 4 volts) and includes circuit breakers and other safety mechanisms. Timing circuit 82 produces two clock signals, CLK at 2 kHz, and CLK2 at 4 kHz. The waveforms of the clock signals are shown in FIG. 6A and 6B, where it can be seen that the CLK2 signal is at twice frequency of the CLK signal and is offset by ¼ wavelength. Drive circuit 84 produces the driving voltage of 8 volts between P1 and P2 to drive the flux gate magnetometer.

The signals S1, S2 from the flux gate magnetometer 60 are fairly weak, and may be vulnerable to interference from other electromagnetic sources, such as the 60 Hz signals from many video displays. Therefore, the signals S1, S2 are passed through high gain selective frequency detectors 86, 87 to amplify the signals. The two detectors circuits 86, 87 have identical layouts.

Figure 7:
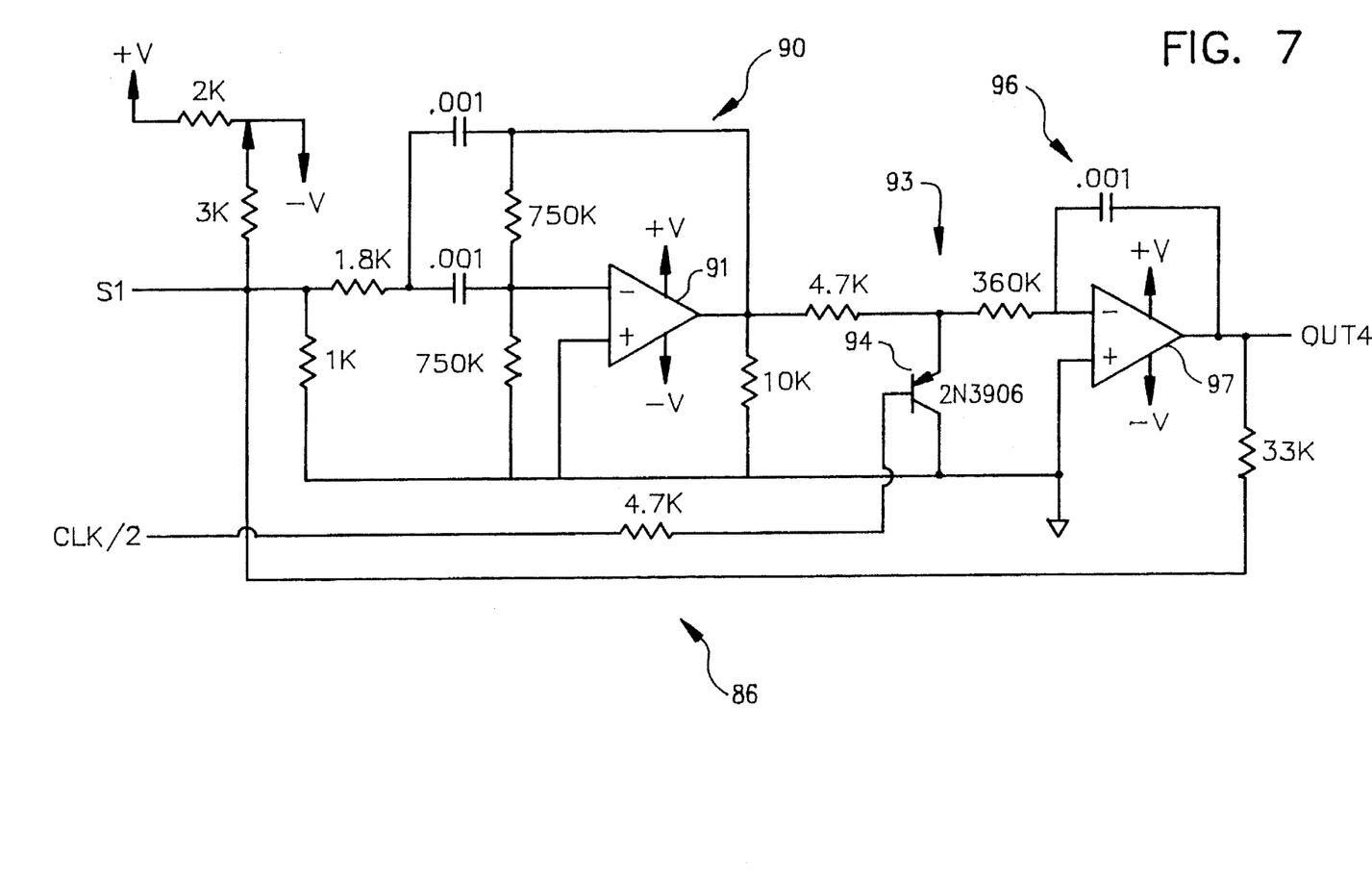
FIG. 7 is a circuit diagram of the detector circuit in the azimuthal orientation sensor.

With reference to FIG. 7, a circuit diagram of detector circuit 86 is shown. The signal S1 from detector coil 74 first passes through a high-gain amplifier with a notch-pass filter 90, which includes the circuit elements centered around op-amp 91. Amplifier 90 boosts the signal by a factor of approximately 400 and selects limited frequency band. The signal then passes through a chopper 93 which converts the AC signal to an average DC signal. Chopper 93 includes the circuit elements centered around transistor 94. The chopper 93 is run at 4 kHz, and thus excludes all extraneous signals so that only the local magnetic field is detected. Finally, the signal passes through integrator 96 which sums the average DC signal. Integrator 96 includes the circuit elements centered around op-amp 97. Integrator 96 produces an DC output with fewer fluctuations. This output is fed back into the amplifier 90. A standard quad-amp chip MC3403P can be used for the four op-amps needed in detector circuits 86, 87. Detector circuit 86 converts the AC signal S1 into a DC signal OUT1 which has a fairly linear proportionality to the external field.

The analog signals OUT1 and OUT2 are run through an A/D converter to become digital signals. These digital signals are then sent to interface 12. Interface 12 may then compare the signals to produce a indication of the azimuthal orientation, and send that information in a useful form to the computer 14. For example, interface 12 or computer 14 may include simple circuitry to process OUT1 and OUT2, or interface 12 may include a look-up table. The exact form of interface 12 will depend on the application for which sensor unit 10 is used.

Tilt Orientation Sensor

Of great importance to the present invention is tilt sensor 22. FIGS. 8 through 13 illustrate the structure and operation of the tilt orientation sensor 22. Tilt orientation sensor 22 operates on the principle of comparing the orientation of the sensor to the Earth's gravitational field.

Figure 8A:
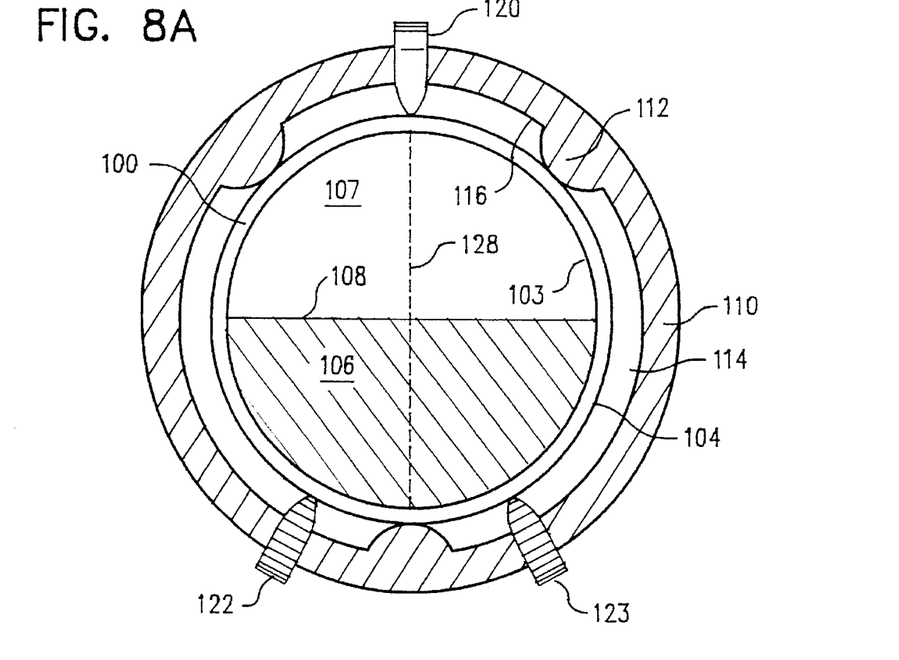
FIG. 8A illustrates a cross-sectional view of the tilt orientation sensor used in the present invention.
Figure 8B:
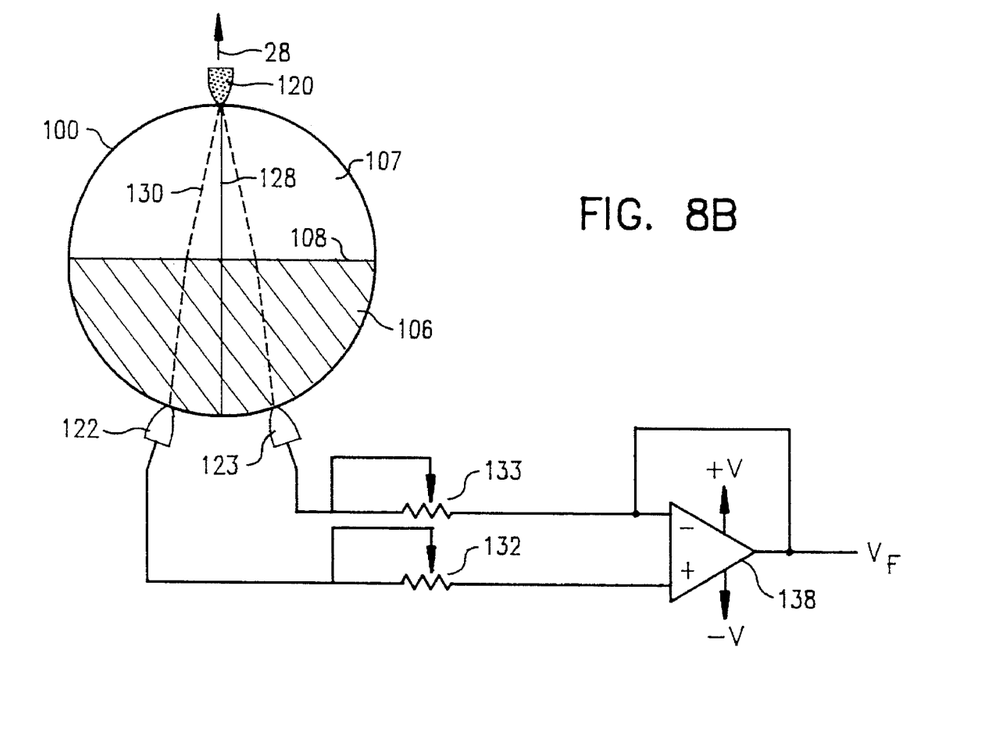
FIG. 8B illustrates the electrical function of a single axis of the present invention, showing in particular the analog circuitry associated with that axis.

FIG. 8A shows the physical structure and FIG. 8B shows the associated electronics of orientation sensor 22. FIG. 8A presents a cross sectional view of the fully assembled tilt orientation sensor 22 taken along a vertical plane. As shown in FIG. 8, a hollow transparent chamber 100 has an inner surface 103 and an outer surface 104. The chamber 100 is partially filled with transparent fluid 106, and partially filled with gas 107. Between the fluid 106 and the gas 107 is boundary surface 108. Naturally the fluid 106 settles to the lower portion of the chamber 100. The chamber 100 in disposed within an optically opaque housing 110. The housing includes support projections 112 for supporting chamber 100 by contact with the outer surface 104. Between outer surface 104 of chamber 100 and the inner surface 116 of housing 110 is air gap 114.

A light source 120 is mounted in housing 106. In the preferred embodiment the light source 120 is mounted next to the upper portion of chamber 100 containing the gas 107. At least two optical detectors 122, 123 are mounted in housing 110. In the preferred embodiment the detectors 122, 123 are mounted next to the lower portion of chamber 100 containing the fluid 106. Light source 120 and optical detectors 122, 123 are positioned to just touch the outer surface 104 of chamber 100. Central axis 128 travels from the light source 120 through the center of chamber 100, and indicates the direction of maximum light intensity as will be explained in connection with FIGS. 11A and 11B. Optical detectors 122, 123 are not mounted directly across from light source 120. In the preferred embodiment, both optical detectors 122, 123 are located at an angle α away from central axis 128. A preferred form of this embodiment will sense the magnitude and direction of angular change by means of four photodetectors and a single light source. In the preferred embodiment, the chamber 100 is spherical and the fluid 106 half-fills the chamber. However, the chamber may be some other shape, or it may not be entirely full, as will be discussed below.

The housing 110 is advantageously fabricated from Noryl, a plastic which is opaque with a non-reflective matte finish. Opaque housing 110 prevents stray light from activating optical detectors 122, 123. It is particularly important for the inner wall 116 of the housing 110 to be generally non-reflective, or proper operation of the tilt orientation sensor 22 could be affected by stray reflections.

FIG. 8B illustrates analog electrical circuitry associated with sensor 22. Light source 120 produces a light cone 130, which is refracted when it encounters boundary surface 108 to become more collimated. Optical detectors 122, 123 detect the collimated light cone 130 and produce light intensity signals which are proportional to the intensity of light at the detectors 122, 123. The output of the optical detectors 122, 123 are applied to a differential amplifier 138. The light intensity signals may be balanced by means of potentiometers 132, 133.

Figures 9, 10A, 10B, 11A, 11B:
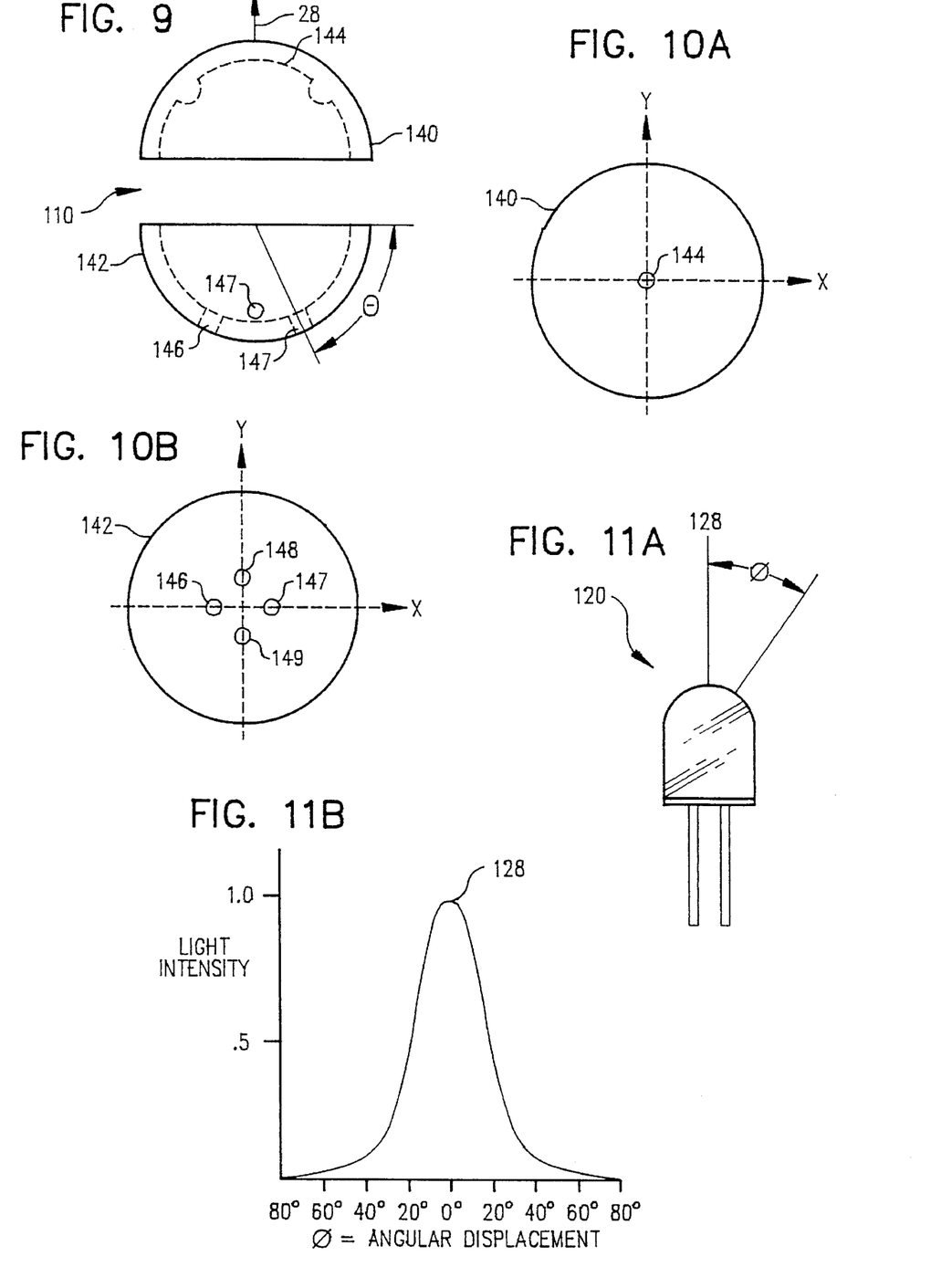
FIG. 9 is a cross-sectional view of the upper and lower members of the housing of the tilt orientation sensor.
FIGS. 10A and 10B illustrates a top and bottom view of the housing of the tilt orientation sensor, showing the relationship of the apertures to the X and Y axes.
FIG. 11A illustrates an LED.
FIG. 11B shows the light intensity of the emitted beam as a function of the displacement angle from the optical axis.

In the preferred embodiment in which housing 110 is spherical, shown in FIG. 9, 10A and 10B, housing 110 will have upper and lower hemispherical members 140, 142 which mate together to form a hollow spherical enclosure. The upper hemispherical member 140 includes a single aperture 144 to receive light source 120. In the preferred embodiment, light source 120 is a light emitting diode (LED). The lower hemispherical member includes four apertures 146–149 into which four optical detectors 122–125 can be mounted. Apertures 146, 147 are located along the X-axis, whereas apertures 148, 149 are located along the perpendicular Y-axis. In the preferred embodiment, optical detectors 122–125 are phototransistors. Referring back to FIG. 8A, LED 120 is shown mounted in apertures 144, and phototransistors 122, 123 are shown mounted in apertures 146, 147. Phototransistors 122, 123 detect tilt in the X-Z plane, and phototransistors 124, 125 (not shown) detect tilt in the perpendicular Y-Z plane. The LED and phototransistors are mounted in the apertures with an adhesive.

Turning back to FIG. 9, the positioning of the light source and optical detectors in the apertures will be explained. The aperture 144 for light source 120 is placed in the upper hemisphere on the vertical axis 28. LED 120 will be aligned so that the central axis 128 of maximum illumination passes through the center of the spherical chamber 100. Apertures 146–149 for phototransistors 122–125 are placed in the lower hemisphere, away from the vertical axis 28 so that they are not mounted opposing the light source 120. Each aperture 146–149 is spaced an angle Θ from the horizontal. In the preferred embodiment, the angle Θ is more than 45°. Preferably Θ is between 60° and 70°, and more preferred Θ is approximately 65°. The phototransistors in the apertures are aligned to aim at the center of the chamber 100.

The LEDs 120 and the phototransistors 122–125 are spectrally matched. In the preferred embodiment, Type TIL 39 light emitting diodes and Type TIL 78 phototransistors (both manufactured by Texas Instruments, Inc. of Dallas, Tex.) are used. FIG. 11A. and FIG. 11B illustrates the typical optical parameters of LEDs 120, showing in particular how light intensity follows a Gaussian-shaped curve. At an angle 20° from the central optical axis 128, light intensity decreases to 50 percent of the maximum value which is along the central optical axis. The phototransistors 122–125 have similar characteristics in the sensing of light.

The transparent fluid 106 has a desirable index of refraction and viscosity. The transparent fluid 106 fills the chamber to the one-half level. In response to tilting of the orientation sensor 22, the transparent fluid 106 flows in the chamber 100 to regain equilibrium. The rate of fluid movement and hence the response speed of the orientation sensor 22 is related to the viscosity of the transparent fluid 106. Fluid having a low viscosity flows more readily than a fluid with a higher viscosity. A higher viscosity fluid provides a damping effect which causes a slow response time. In the preferred embodiment, the transparent fluid 106 is castor oil, which has an absolute viscosity of 986 centipoise at 20 degrees Centigrade. Mineral oil (absolute viscosity=70.4 centipoise) has also been used effectively but results in a faster response speed.

When the chamber 100 is sealed, gas 107, usually air, is trapped therein, above the transparent fluid 106. It should be noted that gas 107 may be extremely thin, so as to virtually constitute a vacuum. As light emitted from the LED 120 strikes the boundary 108 between the air 107 and the transparent fluid 106, a certain part of the light beam is reflected upwardly, but in general a much larger portion passes into the transparent fluid 106 at an angle of refraction. The index of refraction of most transparent liquids fall in the range of 1.35 to 1.55. It is desirable to choose a transparent liquid with the highest practical index of refraction to provided the greatest angles of refraction and therefore the greatest signal differentials. Castor oil, used in the preferred embodiment, has an index of refraction of 1.477.

Figure 12A:
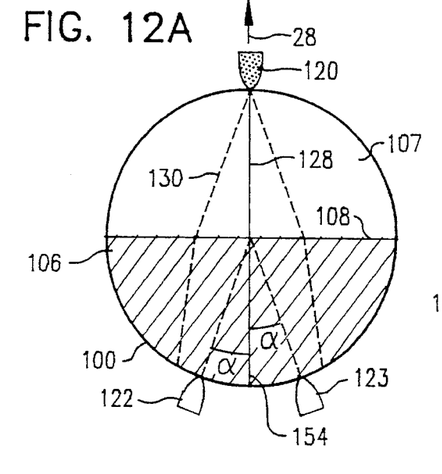
FIGS. 12A, 12B, and 12C illustrate the relationship between the light cone emitted by the LED and the tilt angle of the sensor.
Figure 12B:
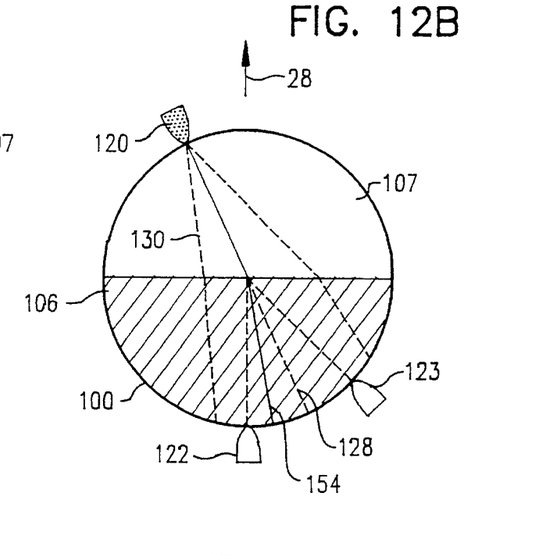
Figure 12C:
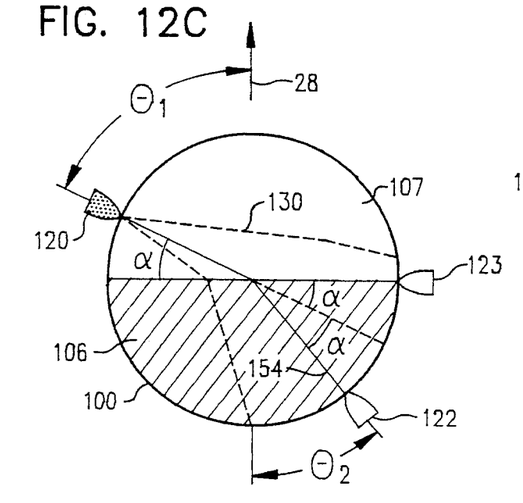

FIGS. 12A, 12B and 12C illustrate the functioning of the LED and phototransistors at various angles of rotation of the sensor 22 with respect to the vertical axis 28. Photodetectors 112 and 113 are disposed at an angle $\alpha$ away from the central axis 128 which passes through the center point of the spherical chamber 100.

In FIG. 12A, the sensor 22 is not rotated (the central axis of illumination of the LED 120 is perpendicular to the surface of the transparent fluid 106 and parallel with the vertical axis 28) and the angle of refraction of the central beam 154 is zero so that it is aligned with central axis 128. An angle $\alpha$ separates both phototransistors 122, 123 are from central axis 128. Light cone 130, represented in FIGS. 12A, 12B and 12C as the region within the dotted lines, is refracted inwardly toward the phototransistors 122, 123, producing a collimating effect. Neither phototransistor 122 or 123 receive the maximum amount of light, but instead they receive approximately equal intensities.

In FIG. 12A the sensor 22 is vertically aligned (the light source 120 is at the top of the chamber and central axis 128 is aligned with the vertical axis 28) and the output $V_0$ of the differential amplifier 136 is zero because the output voltages of the optical detectors 122, 123 are balanced. However, when the sensor 22 is rotated in the positive or negative direction, as shown in FIGS. 12B and 12C, the orientation of boundary surface 108 changes and the angle of refraction changes so that light cone 130 is moved toward one of the detectors. Since the light intensity of light cone 130 is greatest at the center, the light intensity signals from the detectors will vary as the sensor 22 is rotated, and the output voltage of the differential amplifier 144 varies in the positive or negative direction with the magnitude indicating the angle of rotation.

In FIG. 12B, the sensor 22 has been rotated counterclockwise from the vertical axis 28, and the central light beam 154 is refracted downwardly from its central axis 128. The refracted intensity detected by the lower phototransistor 122 is increased, whereas the signal detected by upper phototransistor 123 is decreased.

Finally, in FIG. 12C, the sensor 22 has been rotated from the vertical axis 28 until phototransistor 123 is next to the boundary 108 between the fluid 106 and gas 107. The angle $\alpha$ is chosen so that in this position, the central beam 154 is refracted and phototransistor 122 receives the maximum intensity. The angle $\alpha$ will depend on the index of refraction of the fluid 106 and gas 107. If the gas 107 has an index of refraction $N_1$ and the liquid 106 has an index of refraction $N_2$, then Snell's law states that $N_1 \sin \Theta_1 = N_2 \sin \Theta_2$. Since $\Theta_1 = \pi/4 - \alpha$ and $\Theta_2 = \pi/4 - 2\alpha$, therefore $N_1 \cos \alpha = N_2 \cos 2\alpha$. In the preferred embodiment, the gas 107 is air which has an index of refraction of 1.000 and the liquid 106 is castor oil which has an index of refraction of 1.477. Therefore the angle $\alpha$ is approximately 26°.

If the two phototransistors 122, 123 are displaced from the central axis 128 by an angle less than $\alpha$ then when the tilt sensor 22 is rotated by an angle greater than $\alpha$ the maximum intensity of light from the LED will fall on the inner surface 103 at a point not between the two phototransistors 122, 123 and the output of the differential amplifier 138 will start to decline in amplitude. Therefore, the interface 12 will not be able to differentiate between rotations where the maximum intensity falls between the phototransistors 122, 123 and not between the phototransistors 122, 123. To provide a one-to-one mapping between the output signal and the angle of rotation, the angle $\alpha$ must be greater than that determined by the equation $N_1 \cos \alpha = N_2 \cos 2\alpha$.

It should be noted that this configuration of light source 120 and optical detectors 122, 123 provides a superior range of tilt angles over the prior art. The prior art tilt sensor of U.S. Pat. No. 5,068,645 in which optical detectors were mounted at a 45° angle from the horizonal had a maximum tilt range of 45° before the optical detectors hit boundary surface between the gas and fluid. Since the sensor does not function well when the optical detector is near the boundary, the prior art sensor had an actual effective tilt range of less than 45°. In contrast, since the optical detectors of the present invention are mounted only 26° from the central axis, and thus about 64° from the horizontal, the sensor has a maximum tilt range of 64° before the optical detector strikes the boundary surface 108, and an equivalently large effective tilt range.

Figure 13:
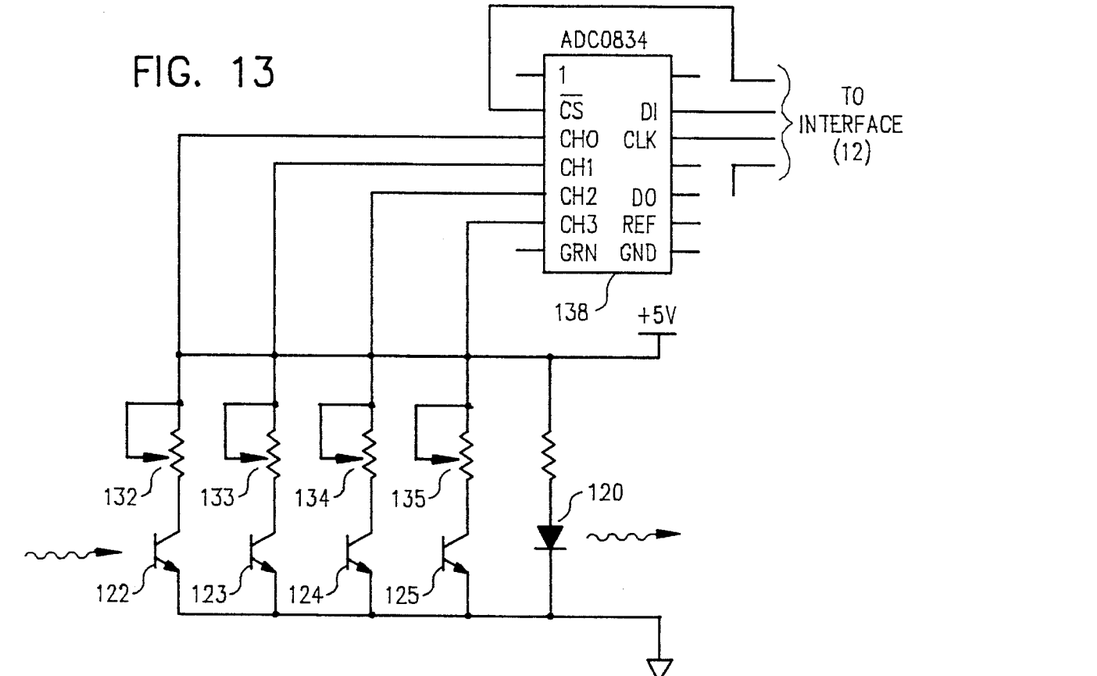
FIG. 13 illustrates the electrical circuitry of the computer input device of the present invention.

Turning now to FIG. 13, the electrical circuitry of the present invention is shown in more detail. Each of the four phototransistors 122–125 has an associated adjustment potentiometer 132–135, for adjustment of gain. The phototransistors are independently adjustable to provide a means of manufacture and testing to overcome problems caused by tolerance variations in the LED and phototransistors.

The phototransistors 122–125 provide input to a four-channel serial analog-to-digital converter 138. In the preferred embodiment, the IC chosen is a Texas Instruments type ADC0834. The analog-to-digital converter employs a data comparator structure to differentially compare the input signals in pairs and output data bytes with eight-bit resolution which indicate the resultant magnitude and sign of the compared signals. Clock (CLK) and chip strobe (CS) are received from the interface 12 for scanning tilt orientation sensor 22. Data is output serially on line DO in response to a chip strobe (CS) to the interface 12.

The purpose of interface 12 is to translate the electrical signals from the sensor unit 10 into signals which are meaningful to the particular application. For example, if the sensor unit 10 is to be used to perform cursor control for conventional digital computer, interface 12 could convert the electrical signals into a standard RS-232C output. In such an application interface 12 may be configured as described in U.S. Pat. No. 5,068,645, incorporated herein by reference.

Figure 14:
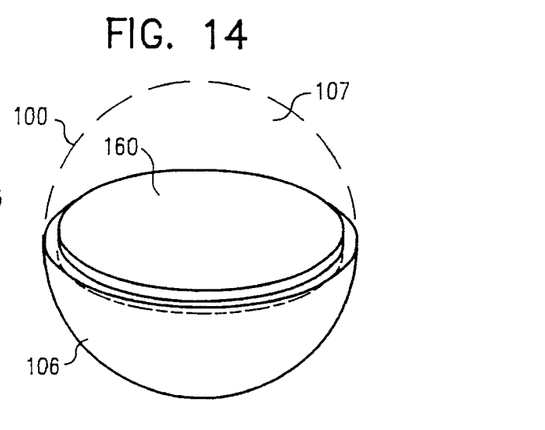
FIG. 14 is a perspective view of the chamber containing the transparent rigid disk used in the tilt orientation sensor.
Figure 15:
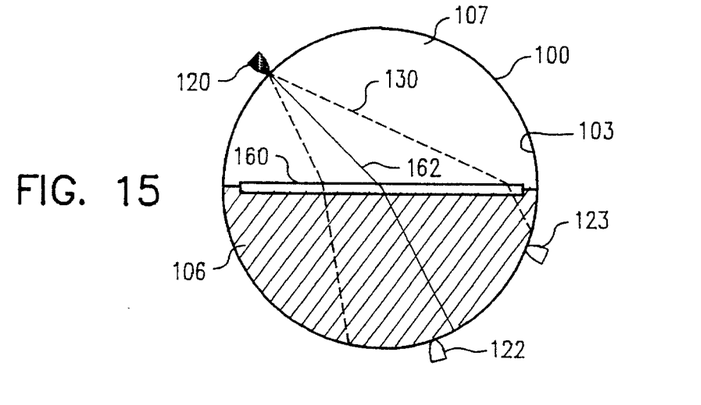
FIG. 15 is a cross section view of the chamber containing the transparent rigid disk used in the tilt orientation sensor.

FIGS. 14 and 15 illustrate an improvement in the configuration of sensor 22. As mentioned above, the prior art tilt sensor suffers from a "sloshing effect" in that when the sensor is suddenly tilted, the fluid flows back and forth creating perturbations in the flatness of the boundary surface. The uneven boundary surface affects the refraction of the incident light and creates errors in the measured tilt angle. In order to reduce this effect, a more viscous fluid may be used, but this causes the reaction time of the sensor to be lowered, and a more pronounced meniscus may form at the edges.

As shown in FIGS. 14 and 15, transparent rigid disk 160 inside the chamber 100 eliminates the perturbations caused when the sensor tilts without sacrificing reaction time. Disk 160 has a density less than that of fluid 106 but greater than gas 107 so that disk 160 floats on fluid 106 at the boundary surface 108. Disk 160 should be thin; a thickness of 0.5 mm or less is preferable. Disk 160 should also be smooth, so that incident light is refracted by a planar surface. Disk 160 should be substantially transparent to the wavelengths emitted by light source 120 and detected by the optical detectors 122–125, although disk 160 need not be perfectly transparent so long as sufficient light reaches the optical detectors 122–125. Transparent disk 160 should have an index of refraction between that of the gas 106 and the fluid 106, and it most preferred for the index of refraction of the disk 160 to be as close as possible to that of the fluid 106. Because the pathlength through the disk 160 will be small, the index of refraction need not match exactly to maintain good performance. In the preferred embodiment transparent disk 160 is plastic.

As shown in FIG. 15, when a light ray 162 enters disk 160 it will be refracted as if it had directly entered fluid 106, and because the fluid 106 and disk 160 are of the same index of refraction, additional reflection or refraction will be minimal. The rigid disk 160 provides a flat, even surface which will not undulate when the sensor 22 is tilted. Disk 160 also acts as a brake, damping the oscillations of the fluid 106, and therefore a less viscous fluid might be used. The disk 160 must occupy a sufficient amount of the boundary surface that the light rays in light cone 130 pass through the disk 160 during normal tilt angles to activate the photosensors 122, 123. A 1 mm gap between the disk and inner surface 103 of the chamber 100 is preferred. An additional benefit of disk 160 is that it allows the photodetectors 122–125 placed closer together because errors from the sloshing effect are reduced, thereby increasing the effective tilt range of the sensor.

Applications for Orientation Sensor

Figure 16:
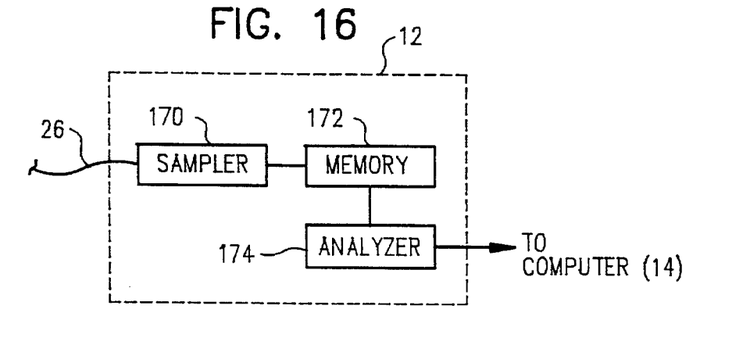
FIG. 16 is a block diagram of the interface configured to sense a gesture of a user.

It may be desirable for computer 14 to react not simply to the orientation of the user but to gestures performed by a user. For example, it may be desirable for the user to move the sensor unit 10 in a circular "O" gesture to turn some function on or off. For this purpose, interface 12 may be configured to include some means to sense gestures. Turning to FIG. 16, a simplified block diagram for circuitry to sense a gesture is shown. Electrical signals from sensor unit 10 enter interface 12 along line 26. The electrical signals are passed through a sampler 170 which measures the signals at regular intervals, for example at a frequency of about 20–100 Hz. A number of measured signals are passed to memory 172 where they are stored and assembled into a time based sequence of orientations. The number of measured signals would depend on the size of memory 172, and the expected length of time, usually several seconds, for a user to execute a gesture. The sequence of orientations are then analyzed by a microprocessor 174 and converted into a gesture signal. Microprocessor 174 may include a character recognition program. Gesture signals are then passed on to the computer 14. Alternately, the gesture sensing function could also be carried out entirely by a program or circuitry within computer 14.

Figure 17:
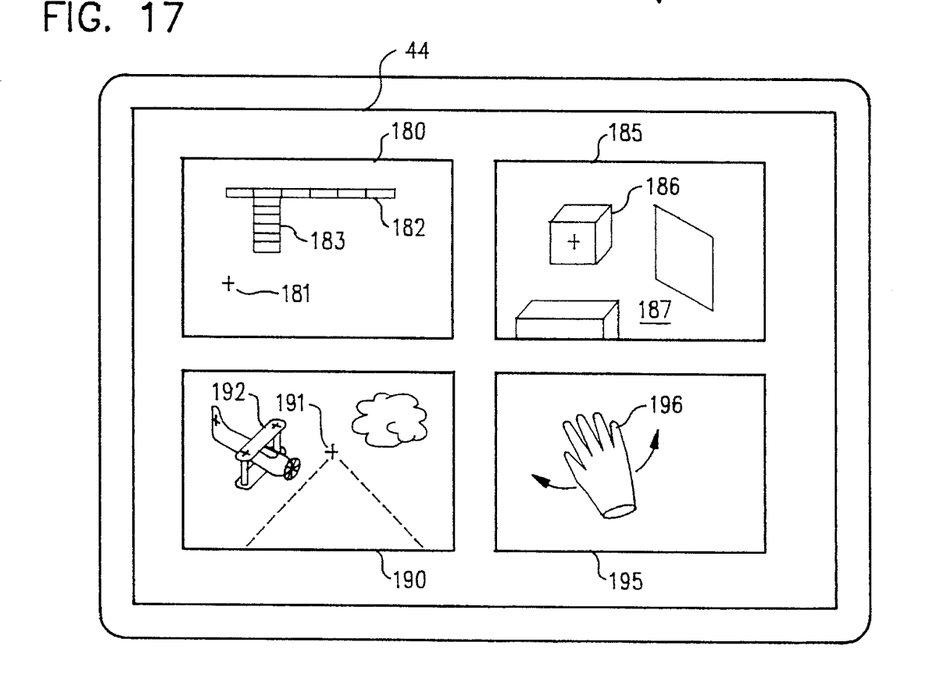
FIG. 17 illustrates a conventional computer display screen showing, in particular, several of the many uses of the present invention.

With the computer input device 10 in place, along with the interface 12 and the computer 14, the user will then be able to perform any manner of cursor movement or computer control, without the need for a flat table surface or other fixed object. In FIG. 17, display screen 44 shows several possible applications for the use of computer input device 10 in four subscreens. For example, in subscreen 180, the input device is used to control cursor movement. Tilting the sensor unit 10 up or down, or rotating the sensor 10 left to right, can effect an corresponding motion of cursor 181 on subscreen 180. Various icons such as menu bar 182 can be displayed on the subscreen, and an azimuthal rotation of the sensor unit 10 from side to side can activate a selection such as pull down menu 183. In subscreen 185, the input device is used to manipulate a virtual object 186 inside virtual reality environment 187. Tilting and rotating the sensor unit 10 can act to manipulate virtual object 186. In subscreen 190, the input device is used to play a video game. In this use, the direction of the sensor 10 determines the speed and direction in which the subscreen 190 will scroll. Tilting the sensor 10 back or forward would cause the subscreen 190 to scroll up or down, and the speed of scrolling corresponds to the angle of the sensor unit 10. Gunsight 191 may be located in the center of the subscreen 190, and the user would attempt to scroll the screen to cause enemy aircraft 192 to appear in gunsight 191. In subscreen 195, the sensor unit 10 is used to track the orientation of a hand. The sensor unit 10 is attached to a glove and a graphic representation 196 of the glove can be displayed on the subscreen 195. As the user twists and rotates the glove, the glove representation 196 will emulate the motion of the user.

In view of the above, it will be seen that the objects of the present invention are readily achieved and other advantageous results are attained.

Obviously many modifications and variations of the present invention are possible in light of the above teachings, without departing from the spirit and scope of the invention. Although the input device is designed to simulate a computer input device, the principles of the present invention, the novel orientation sensor and control circuitry could be housed in various convenient and useful shapes, including handheld devices. Because the orientation sensor disclosed herein determines the direction and magnitude of angular change and azimuthal orientation, it is naturally applicable to a wide range of uses including automatic leveling devices and robotic feedback control systems.

Moreover, in the preferred form disclosed herein control functions are not limited to the display of a cursor on a display screen. For example, a motorized wheelchair equipped with a input system such as the one described could provide a handicapped user with speed and directional control, without the need for hands or limbs to operate control switches. In view of this, it is understood that the above description is illustrative rather than limiting.

What is claimed is:

1. An orientation sensor comprising:

a frame defining a frame axis;

Velcro strap means for attaching said frame to the head of a user, said strap means having a foam insert tilt sensing means, maintained in a fixed orientation with respect to said frame, for measuring the orientation of said frame with respect to the Earth's gravitational field and providing a tilt signal that is related to the angle of tilt of the sensor to detect rotation of said frame axis from vertical;

magnetic sensing means, attached to a printed circuit board maintained in a fixed orientation with respect to said frame, for measuring the orientation of said frame with respect to the Earth's magnetic field and providing an azimuth signal related to the azimuthal angle of the magnetic sensing means to detect rotation of said frame about said frame axis by comparing the orientation of the magnetic sensing means to the local magnetic field generated by the Earth using the phase and relative strength of signals output from said magnetic sensing means and using a difference obtained from said comparing to determine an azimuthal angle wherein said magnetic sensing means includes an array of three flux gate magnetometers aligned along mutually perpendicular axes and electronics means for driving the magnetometers including a copper excitation coil surrounding said magnetometer and for detecting signals from the magnetometers, each said magnetometer including a saturable ferrous metal, torroid-shaped core having a diameter of about one inch, which saturates at a frequency of about 2 kHz with a peak-to-peak voltage of about 8 volts, said electronic means configured to drive each said saturable core to neat its magnetic saturation at a frequency such that said local magnetic field causes flux to leak from each said core and wherein said electronics means for detecting signals includes first and second coils at right angles to one another and at right angles to the plane of the torroid, configured to detect each said flux leak at a frequency twice said first frequency wherein as said magnetic sensing means is rotated signals from said first and second coils change;

said printed circuit board containing analog circuitry means for operating said tilt sensing means and said magnetic sensing means, an analog-to-digital converter means for transforming said tilt signals and said azimuth signals to digital form signals and digital circuitry for communication over a first wireless transmitter communications means to an interface means for translating said digital form signals into control signals which can be interpreted by a computer;

said interface means including a programmed microcontroller for receiving said digital form signals to provide a standard RS-232 output to said computer and configured to simulate the operation of a standard cursor control mouse device;

power circuit means for providing steady DC voltages of +5 volts, about +4 volts and about −4 volts, said power circuit means including circuit breakers;

timing circuit means for producing a first timing signal at 2 kHz and a second timing signal at 4 kHz, offset from said first timing signal by ¼ wavelength, said second timing signal being provided to said detecting means;

drive circuit means for receiving said first clock signal and producing a voltage of 8 volts to drive said magnetic sensor;

said detecting means comprising first and second identical high gain selective frequency detectors a high-gain uplifter means with a notch filter having a gain of about 400, for selecting a first limited frequency band;

a 4 kHz chopper means, receiving an output from said high-gain amplifier means, for excluding extraneous signals so that only the local magnetic field is detected;

an integrator means, receiving an output from said chopper means, for reducing the number of signal fluctuations and providing feedback to said high-gain amplifier means and an output signal with substantially linear proportionality to an external field a sensory means having left and right liquid crystal display means for displaying different images to provide a stereoscopic visual system, mounted in goggles attached to the user's head providing visual display to the user and earphone means providing stereo audio to the user, wherein said visual display and audio alter to emulate orientation of the user's head in a virtual reality environment and means for controlling the speed and direction of scrolling of said display in response to the direction of the sensor.

* * * * *